(12) United States Patent
Schmider et al.

(10) Patent No.: US 6,396,226 B2
(45) Date of Patent: *May 28, 2002

(54) ELECTRONICALLY COMMUTATED DC MOTOR

(75) Inventors: Fritz Schmider, Hornberg; Stefan Lukenich, Singen, both of (DE)

(73) Assignee: Papst Motoren GmbH & Co. KG, St. Georgen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,208

(22) Filed: Nov. 30, 2000

(30) Foreign Application Priority Data

Dec. 1, 1999 (DE) ................................. 299 21 161 U

(51) Int. Cl.$^7$ ............................................... H02P 7/06
(52) U.S. Cl. ...................... 318/254; 318/138; 318/439
(58) Field of Search ............................... 318/700, 701, 318/434, 138, 254, 439

(56) References Cited

U.S. PATENT DOCUMENTS

| 3,801,887 A | * | 4/1974 | Allard | ........................ 318/138 |
| 3,997,823 A | | 12/1976 | Machida | ..................... 318/138 |

(List continued on next page.)

FOREIGN PATENT DOCUMENTS

| DE | 2 311 398 | 9/1974 |
| DE | 23 39 077 | 2/1975 |
| DE | 24 50 968 | 5/1975 |
| DE | 30 06 707 C2 | 10/1980 |
| DE | 87 02 271.0 U | 7/1987 |
| DE | 39 19 952 A1 | 12/1990 |
| DE | 295 01 695.7 U | 7/1995 |
| DE | 44 38 569 C2 | 5/1996 |
| DE | 296 16 169 U1 | 1/1997 |
| DE | 198 26 458 A1 | 12/1999 |
| EP | 0 316 077 A1 | 5/1989 |
| EP | 0 908 630 A1 | 4/1999 |
| EP | 0 957 570 A2 | 5/1999 |

OTHER PUBLICATIONS

Derwent WPI English abstract of DE 87–02271–U, publ. Jul. 16, 1987.

(List continued on next page.)

Primary Examiner—Khanh Dang
Assistant Examiner—Rina I. Duda
(74) Attorney, Agent, or Firm—Milton Oliver; Ware, Fressola, Van Der Sluys & Adolphson LLP

(57) ABSTRACT

An electronically commutated motor (4) has a stator (14) with two winding phases (25, 26) which are alternatingly supplied with current during one rotor rotation through 360° cl. The motor also has a permanent-magnet rotor (28) which, when the motor (4) is currentless, assumes at least one predefined rotational position from which the rotor starts in a desired rotation direction upon excitation of a predefined winding phase. A bistable multivibrator (64), which is controlled by the voltage that is induced by the rotor in the instantaneously currentless winding phase, is provided for alternatingly switching on the two winding phases. The bistable multivibrator (64) has an electrical preferred position (92) that it assumes when the motor (4) is switched on, in order to supply power, during the switching-on operation, to the predefined winding phase and thereby to allow the rotor to start in the desired rotation direction. The motor current can be temporarily increased at startup in order to increase the torque at startup.

11 Claims, 5 Drawing Sheets

U.S. PATENT DOCUMENTS

| | | | | |
|---|---|---|---|---|
| 4,156,168 A | | 5/1979 | Vogel | 318/254 |
| 4,162,435 A | * | 7/1979 | Wright | 318/138 |
| 4,275,343 A | * | 6/1981 | Fulton et al. | 318/721 |
| 4,359,674 A | | 11/1982 | Gotou | 318/318 |
| 4,401,926 A | * | 8/1983 | Morton et al. | 318/376 |
| 4,459,519 A | * | 7/1984 | Erdman | 318/254 |
| 4,459,532 A | * | 7/1984 | Schutten et al. | 318/781 |
| 4,520,303 A | * | 5/1985 | Ward | 318/778 |
| 4,868,479 A | * | 9/1989 | Byong-Ho et al. | 318/721 |
| 4,874,993 A | | 10/1989 | Tanaka | 318/254 |
| 5,327,052 A | | 7/1994 | Sakurai | 318/254 |
| 5,652,825 A | * | 7/1997 | Schmider et al. | 388/822 |
| 5,682,088 A | | 10/1997 | Sonnek | 318/254 |
| 5,831,359 A | | 11/1998 | Jeske | 310/68 B |
| 6,013,966 A | | 1/2000 | Fehrenbacher | 310/257 |

OTHER PUBLICATIONS

Derwent WPI English abstract of DE 295 01 695–U, publ. Aug. 9, 1995.

Derwent WPI English abstract of DE–39 19 952–A1, Schroeter+/Licentia, publ. Dec. 20, 1990.

Derwent WPI English abstract of DE 44 38 569–C2, Baumann+/Bosch, published May 2, 1996.

Derwent WPI English abstract of EP 0 957 570–A2, Zeh+ Oljaca–Werke, publ. Nov. 17, 1999.

Derwent WPI English abstract of DE 23 29 077–A, Moczala, published Feb. 13, 1975.

Derwent WPI English abstract of DE 23 11 398–A, Fichter/Kienzle, published Sep. 12, 1974.

* cited by examiner

ELECTRONICALLY COMMUTATED DC MOTOR

FIELD OF THE INVENTION

The present invention relates generally to an electronically commutated direct-current motor (ECM).

BACKGROUND

Motors of this kind are used, inter alia, to drive miniature fans (cf. EP-A1-0 908 630 and corresponding U.S. Pat. No. 6,013,966, FEHRENBACHER et al). For various reasons, it may be desirable to operate such a motor without a Hall generator, and for that purpose to commutate it with the voltage that is induced, during operation, by the rotor in the stator winding. This is known, for example, from U.S. Pat. No. 4,156,168, VOGEL, but in the case of this known motor the direction in which it will start after being switched on is not certain, and this known motor is therefore suitable only for specific applications in which rotation direction is not important.

SUMMARY OF THE INVENTION

One object or the invention is therefore to provide new electronically commutated motor whose startup rotation direction is certain. In accordance with the invention, the motor used is one having a rotor that, when the motor is currentless, has at least one mechanical preferred position. The current in the motor is controlled using a bistable multivibrator that has, at startup, an electrical preferred position which is adapted to the mechanical preferred position of the rotor. At startup, the result of the electrical preferred position is that the stator is excited in such a way that the rotor starts, from its mechanical preferred position, in the correct rotation direction. Because a separate rotor position sensor is eliminated, a motor of this kind has a simple configuration with good efficiency, since the power consumption for a rotor position sensor is eliminated. The invention is therefore particularly advantageous for miniature and subminiature motors in which the power consumption of a rotor position sensor, for example a Hall IC, would greatly reduce the electrical efficiency; and it is highly suitable, for example, for motors in which the electronic components are arranged separately from the actual motor (i.e. stator with stator winding, and rotor).

Further details and advantageous developments of the invention are evident from the exemplary embodiment described below and shown in the drawings, which is in no way to be understood as a limitation of the invention.

BRIEF FIGURE DESCRIPTION

DETAILED DESCRIPTION

Figure 1:
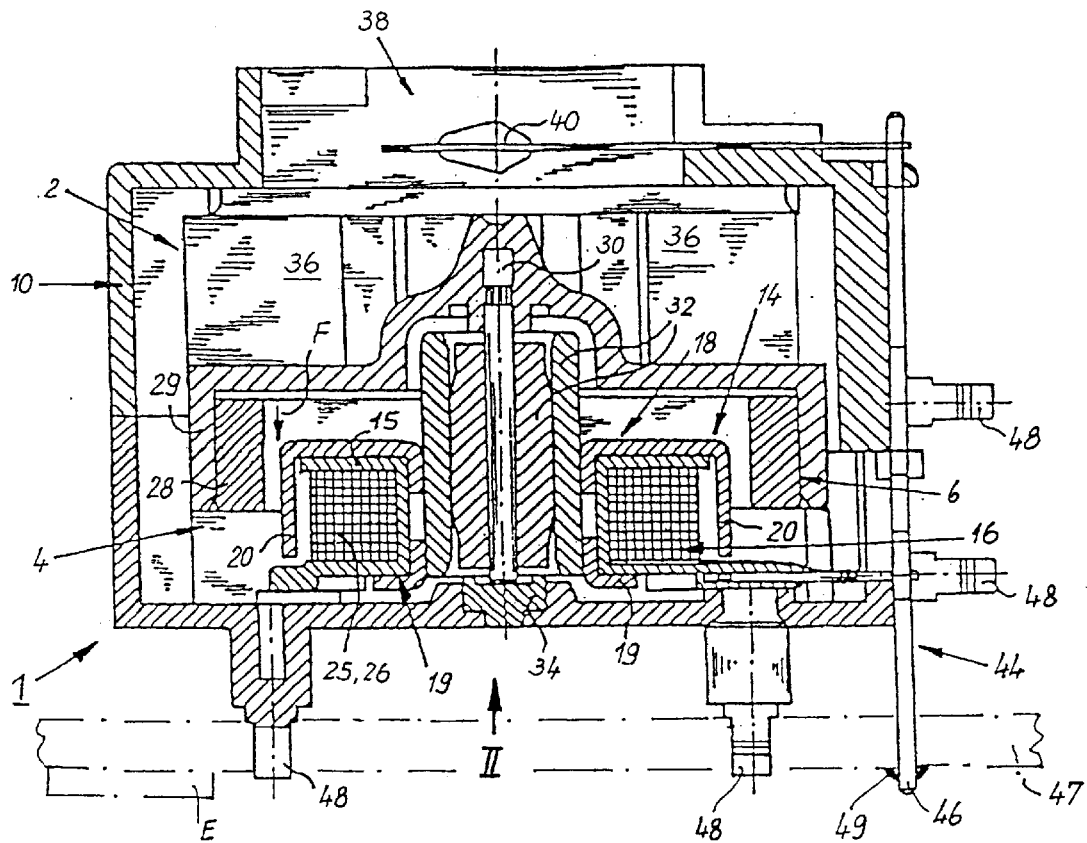
FIG. 1 is a longitudinal section through a fan 1 that is driven by an electronically commutated motor 4.
Figure 2:
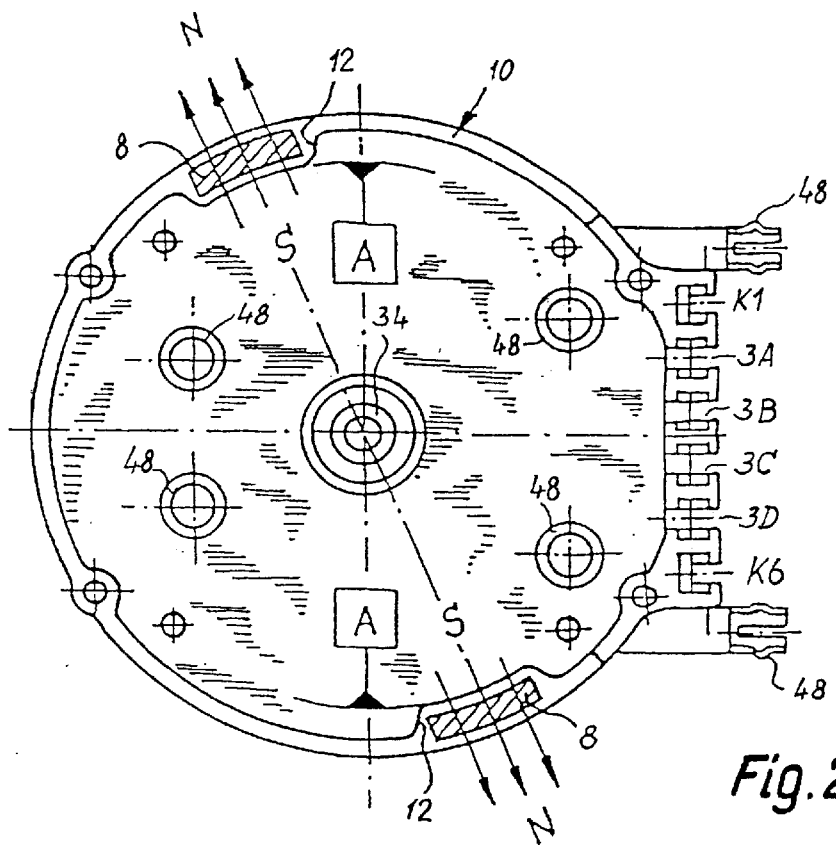
FIG. 2 is a plan view at the fan of FIG. 1, viewed in the direction of arrow II of FIG. 1.

FIGS. 1 and 2 show, purely by way of example, a radial fan 1 as known from U.S. Pat. No. 6,013,966. This has a fan wheel 2 and an electronically commutated external-rotor claw polo motor 4 which directly drives fan wheel 2. Motor 4 has a permanent magnet external rotor 6. As shown in FIG. 2, two diametrically opposite positioning magnets 8 are provided, when motor 4 is at a standstill, these rotate rotor 6 into a preferred position (also called the "starting position") from which it can easily start up. Magnets 8 are arranged in pocket 12 of fan housing 10.

Figure 3:
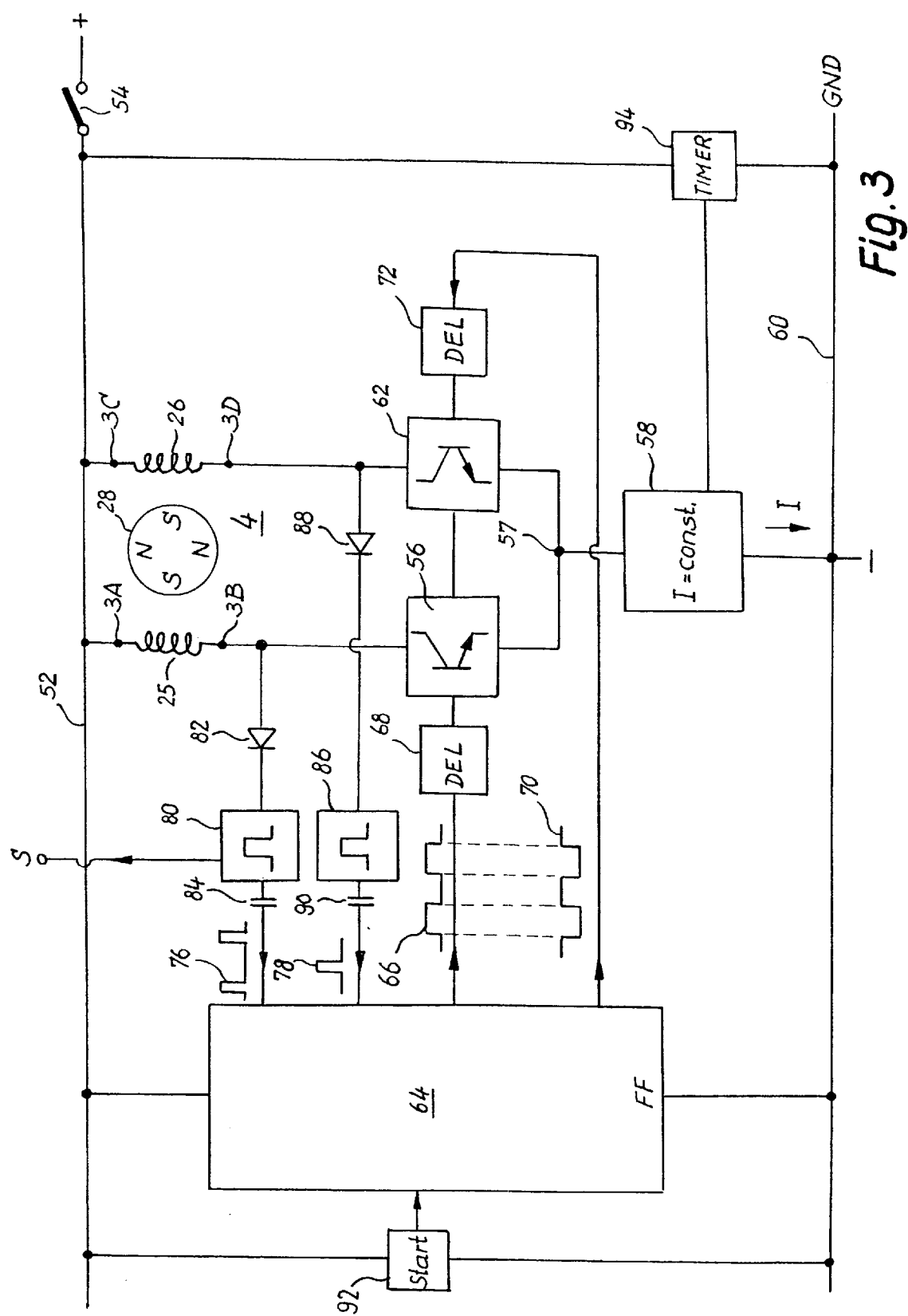
FIG. 3 is a schematic circuit diagram of a motor according to the present invention.
Figure 4:
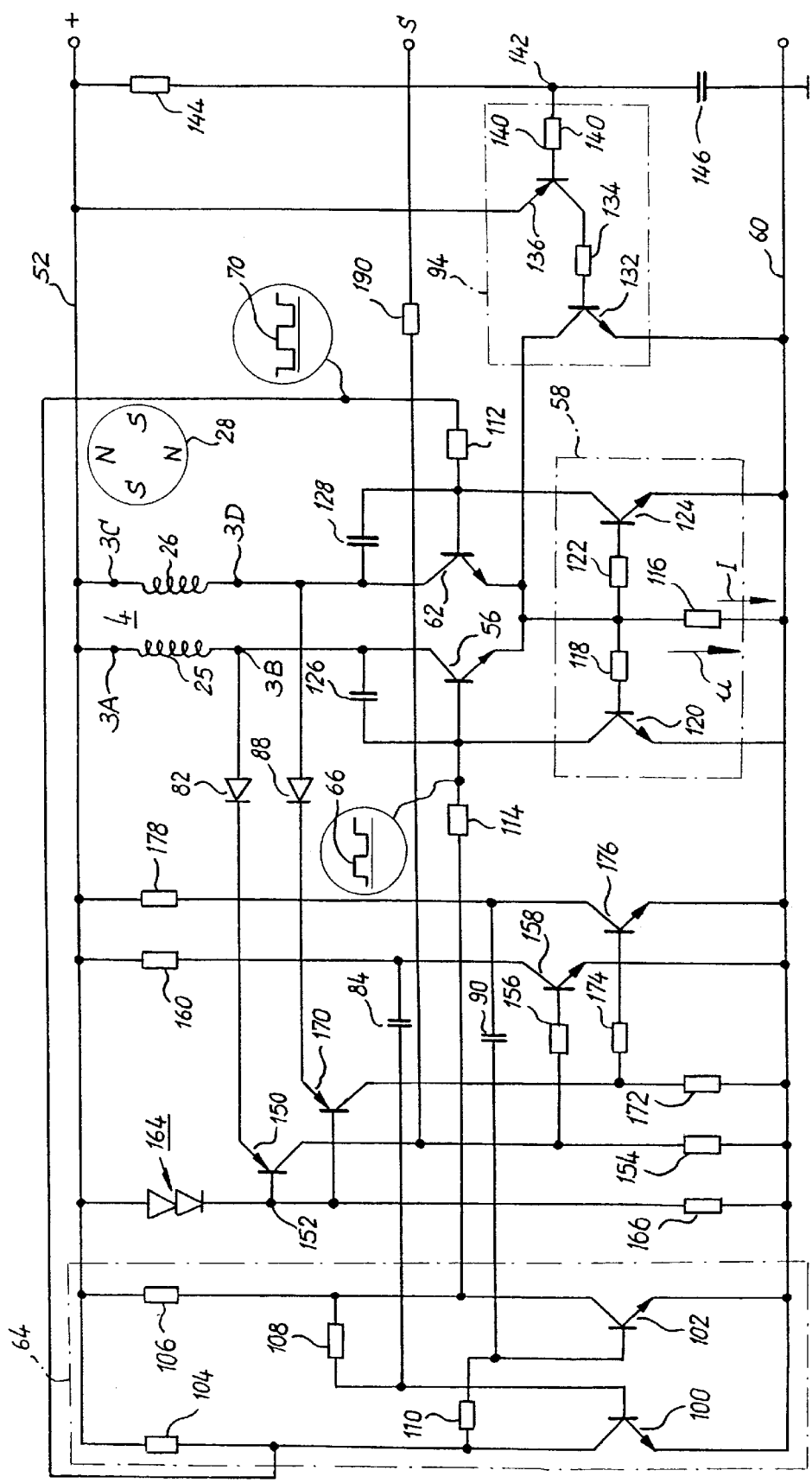
FIG. 4 shows a preferred exemplary embodiment of a circuit corresponding to FIG. 3, with further details.

Motor 4 has a stator 14 with two opposing claw-pole pieces 18, 19 between which, as shown, is located an annular winding 16 on a winding body 15. Winding 16 is wound in bifilar fashion and has two winding phases 25 and 26 which are also shown in FIGS. 3 and 4. Phase 25 has two terminals 3A and 3B which are shown in FIGS. 2, 3, and 4, and phase 26 has two terminals 3C and 3D.

Claw-pole pieces 18, 19 have claw poles 20 which extend in an axial direction (cf. FIG. 1). The rotor magnet is labeled 28, and can be a so-called "rubber magnet," i.e. a mixture of rubber and hard ferrite. It is located in a support piece 29 that is configured integrally with fan wheel 2 and in which a shaft 30 is also mounted. The latter runs in a radial plain bearing 32, and its free end is axially braced against a thrust bearing 34. Rotor 6 is axially offset with respect to stator 14 in order to generate a force F directed toward bearing 34.

Fan wheel 2 has radially extending fan blades 36. An axial air intake opening is labeled 38. Located in it is an NTC (Negative Temperature Coefficient) resistor 40 that serves as a temperature sensor and is connected to two terminals K1 and K6 (FIG. 2).

Terminals K1, K6, and 3A through 3D extend axially downward in the form of elongated pins 44 whose lower ends 46 can be soldered, as shown at 49, onto a circuit board 47 indicated with dot-dash lines. Mounts 48 for attaching fan 1 are also provided. With these mounts, the fan can ba attached, for example, to circuit board 47.

Fans of this kind are particularly suitable for use as so-called "circuit board fans," i.e. for direct placement on a circuit board in order to cool components present thereon. Reference is made to U.S. Pat. No. 6,013,966 for further details.

The electronic components E for operation of such a fan are often mounted by the customer on its own circuit board 47, as symbolically indicated in FIG. 1, and the customer purchases only a "naked" fan 1 and installs it on its circuit board, so that an operable motor is created only by such installation. This kind of "motor manufacture" generally makes it impossible to use rotor position sensors, for example a Hall generator, which is otherwise often used in electronically commutated motors to control commutation.

Since rotor magnet 28 is located, because of the effect of stationary magnets 8, in a predefined starting position or in one of a plurality of predefined starting positions when the motor starts, a predefined winding phase of stator winding 16 must receive a starting current in a predefined direction upon switching on. The circuit shown in FIGS. 3 and 4 serves to switch on this starting current. As a result of this starting current, rotor magnet 28 is caused to rotate in the desired direction and thereby induces voltages in the two winding phases 25 and 26; these voltages, after suitable pulse shaping, cause commutation of the current through the two winding phases 25 and 26. This is also known in the art as "commutation with the induced voltage."

Instead of the motor defined in U.S. Pat. No. 6,013,966, it is of course possible to use in the same fashion, for example, a motor as defined in German Utility Model DE U1 295 01 695.77 or in German Utility Model DE-U1 8 702 271.0. FIGS. 1 and 2 thus represent only a preferred exemplary embodiment whose purpose is to allow a better comprehension of the invention since, without such an example, the invention might possibly be difficult to understand.

FIG. 3 is an overview circuit diagram to explain basic functions of the present invention.

As show in FIG. 3, winding phase 25 is connected at its terminal 3A to a positive line 52 that can be connected via a switch 54 to a voltage source (not shown), usually to the battery of a vehicle with a voltage between 8 and 16 V. The other terminal 3B of winding phase 25 is connected to a first semiconductor switch 56 that in turn is connected via a node 57 and a current regulator 58 to a negative line 60 (ground).

Second winding phase 26 is connected at its terminal 3C to positive line 52, and its terminal 3D is connected via a second semiconductor switch 62 to node 57.

Semiconductor switches 56, 62 are controlled via a bistable flip-flop 64, which during operation generates first square-wave commutation signals 66 which are fed via a delay circuit 68 to first semiconductor switch 56, and second square-wave commutation signals 70 which are opposite in phase to first square-wave commutation signals 66 and are fed via a delay circuit 72 to second semiconductor switch 62.

The function of delay circuits 68, 72 is to delay the switching on and off of semiconductor switches 56 and 62, respectively, and to make those operations less abrupt, so that motor 4 runs particularly quietly.

Pulses 76, 78 serve to reverse flip-flop 64. Pulses 76 are generated by an arrangement 80 which has conveyed to it, via a diode 82, the so-called "induced voltages" or "counter-EMF" that is induced by rotor magnet 28 in the currentless winding phase 25. Thin voltage is converted in arrangement 80 into a square-wave signal, and its edges are differentiated by a capacitor 84 and generate the pulses 76 which commutate flip flop 64 into the one direction.

Pulses 78, which are offset in time with respect to pulses 76, are generated by an arrangement 86 which has applied to it, via a diode 88, the voltage that is induced by rotor magnet 28 in the currentless winding phase 26. That voltage is converted in arrangement 86 into a square-wave signal, and its edges are differentiated by a capacitor 90 and generate pulses 78 which commutate flip-flop 64 into the other direction.

For starting, flip-flop 64 acquires a specific electrical position due to a starting apparatus 92.

Since the operating voltage in a motor vehicle can be, for example, between 8 and 16 V, current regulator 58 regulates motor current I (FIG. 3) to a predefined value that corresponds, for example for a specific fan 1, to a rotation speed of 2800 RPM. Directly after switch 54 switches on, current regulator 58 is deactivated by a timer 94 for a predefined time period so that motor 4 can start up with its maximum performance.

Mode of operation (FIG. 3)

At startup, constant-current regulator 58 is deactivated by timer 94 for a predefined time. e.g. for 0.5 second, so that motor 4 can start at maximum current. At the same time, switching member 92 brings flip-flop 64 into a suitable electrical position so that, for example, first semiconductor switch 56 is switched on and first winding phase 25 receives current, with the result that rotor magnet 28 begins to rotate at high acceleration in the desired rotation direction.

Figure 5:
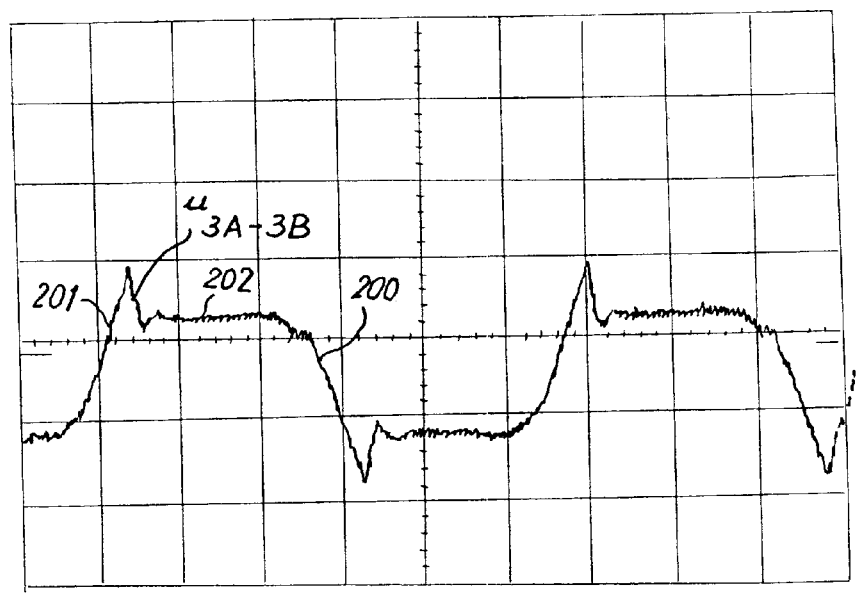
FIG. 5 is a graph of the voltage that occurs during operation at winding phase 25 of FIG. 4, i.e. between points 3A and 3B.

During that rotation, an alternating voltage is induced by rotor magnet 28 in each of winding phases 25 and 26 (cf. FIG. 5). The positive part of the alternating voltage in winding phase 25 is fed via diode 82 to arrangement 80, and the positive part of the alternating voltage in winding phase 26 is fed via diode 88 to arrangement 86.

In arrangements 80, 86, the relevant voltages are converted into square-wave signals, and the latter are differentiated by capacitors 84 and 90, respectively, thereby creating pulses 76 and 78, respectively, which switch flip-flop 64 between its bistable positions.

The result is to create pulse sequences 68, 70 which, as rotor magnet 28 rotates, effect commutation of motor 4, i.e. the switching on and off of semiconductor switches 56 and 62, respectively.

When motor 4 begins to reach its operating speed, current regulator 58 is activated by timer 94 and controls current I to a predefined value that is independent of the value of the operating voltage. In a motor vehicle, the latter can vary at a ratio of 1:2. In the case of a defined load, e.g. when a fan is being driven, current I represents an indirect indication of the rotation speed; in other words, if current I is controlled to a predefined value, then the rotation speed is thereby kept at a predefined value.

FIG. 4 shows a preferred exemplary embodiment of the invention. Identical or functionally identical parts are labeled with the same reference characters as in the preceding figures, and usually are not described again.

Bistable flip flop 64 contains two npn transistors 100, 102 whose emitters are connected to negative line 60 and whose collectors are connected via respective resistors 104 and 106 to positive line 52. The base of transistor 100 is connected via a resistor 108 to the collector of transistor 102, and the base of transistor 102 is connected via a resistor 110 to the collector of transistor 100.

If transistor 100 is conductive, the base of transistor 102 has a low potential and that transistor is blocked, so that transistor 100 receives a base current via resistor 108. Because of the symmetry of the circuit, the converse is equally true. Flip-flop 64 thus has two stable states, and it can be switched back and forth between those stable states by way of electrical pulses. This switching back and forth occurs at the time of each zero crossing of the negative edges of the induced voltage.

Figure 6:
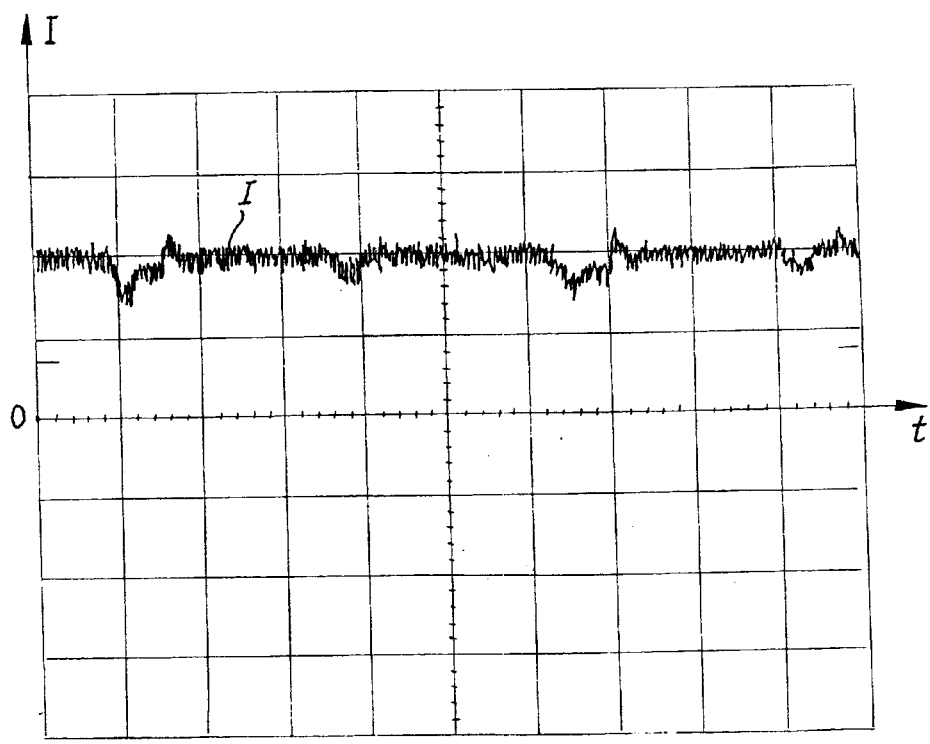
FIG. 6 is a graph of the total current I for the arrangement shown in FIG. 4.

When transistor 100 is conductive, the base of npn transistor 62 (which serves as the second semiconductor switch) acquires a low potential via a resistor 112, and that transistor is blocked. Transistor 102 is inhibited, and npn transistor 56, which serves as the first semiconductor switch, therefore acquires—via resistor 106 and a resistor 114—a positive potential at its base and becomes conductive, so that a current flows through winding phase 25. That current I is regulated by current regulator 58 to an approximately constant value (cf. FIG. 6).

Current I flows through a shared emitter resistor 116 of transistors 56 and 62, and voltage U at that resistor 116 is fed via a resistor 118 to the base of an npn transistor 120, and via a resistor 122 to the base or an npn transistor 124. The collector of transistor 120 is connected to the base of transistor 56, and the collector or transistor 124 to the base of transistor 62. The emitters of transistors 120, 124 are connected to negative line 60.

When current I rises, transistors 120 and 124 become more conductive, so that the base current of transistor 56 or 62 that is conductive at that instant is correspondingly reduced, bringing about a decrease in current I. The latter is thereby kept at a constant value (cf. the oscillogram in FIG. 6).

Each at transistors 56, 62 is equipped with a so-called Miller capacitor 126, 128 between its collector and its base. Coacting with base resistors 114 and 112, respectively, these capacitors effect a delay in the rise and fall of current in the transistor in question, and thus make motor 4 run particularly smoothly. Miller capacitors 126, 128 and resistors 112, 114 thus represent an embodiment of delay circuits 68, 72 of FIG. 3.

The purpose of timer 94 is to deactivate current regulator 58, for a period of, for example, 0.5 seconds after motor 4 is switched on, by bypassing current controller 58 via an npn transistor 132.

Transistor 132 is controlled by a pnp transistor 136 whose collector is connected via a resistor 134 to the base of transistor 132, whose emitter is connected to positive line 52, and whose base is connected via a resistor 140 to a node 142 that is connected via a resistor 144 to positive line 52 and via a capacitor 146 to negative line 60.

Capacitor 146 is discharged when motor 4 is switched on, so that transistor 136 has a negative base potential and conducts. Transistor 132 thereby receives a base current and is also conductive, so that it bypasses current regulator 58.

Capacitor 146 then charges through resistor 144, with the result that, after about 0.5 second, the two transistors 136 and 132 are inhibited, so that current regulator 58 is activated. At this point in time, motor 4 has usually reached its operating speed.

Diode 82 is connected at its anode to terminal 3B of first winding phase 25, and at its cathode to the emitter of a pnp transistor 150 whose base is connected to a node 152 and whose collector is connected via a resistor 154 to negative line 60 and via a resistor 156 to the base of an npn transistor 158, whose emitter is connected to negative line 60 and whose collector is connected via a resistor 160 to positive line 52 and, via capacitor 84 (cf. FIG. 3), to the base of transistor 100.

Node 152 is connected via series circuit 164 of two diodes (e.g. BAV99) to positive line 52, and via a resistor 166 (e.g. 51 kΩ) to negative line 60. Node 152 thus has a potential that is more negative, by an amount equal to a substantially constant voltage, than the potential of positive line 52. Transistors 150, 170 are thereby brought to their switching threshold, so that transistor 150 senses the temporally later zero crossing (at approximately 200 in FIG. 5) of the positive voltage induced in winding 25, and transistor 170 senses the temporally later zero crossing of the positive voltage which is induced in winding 26.

Diode 88 is connected at its anode to terminal 3D of second winding phase 26, and at its cathode to the emitter of a pnp transistor 170 whose base is connected to node 152 and whose collector is connected via a resistor 172 to negative line 60 and via a resistor 174 to the base of an npn transistor 176 whose emitter is connected to negative line 60 and whose collector is connected via a resistor 178 to positive line 52 and via capacitor 90 (cf. FIG. 3) to the base of transistor 102.

When transistor 56 is conductive, point 3B has a low potential and diode 82 is blocked. When transistor 56 is inhibited by commutation, winding 25 is currentless and rotor 19 induces in winding 25 a positive voltage half-wave 202 (FIG. 5) that is more positive than the potential at node 152, so that diode 82 becomes conductive and transistor 150 receives a base current, also becomes conductive, and in turn makes transistor 158 conductive, so that by way of capacitor 84, transistor 100 of flip-flop 64 is kept blocked, and by way of resistor 112, transistor 62 receives a base current and allows a current to flow through second winding phase 26.

After a rotor rotation of approximately 180° el. of phase, the potential at point 3B drops below the potential at node 152, so that diode 82, transistor 150, and transistor 158 are inhibited, i.e the voltage at the collector of transistor 158 suddenly becomes more positive, and capacitor 84 transfers that change in potential to the base of transistor 100 in flip-flop 64, so that transistor 100 becomes conductive and consequently, via transistor 110, transistor 102 is inhibited.

The switchover of flip-flop 64 is thus brought about by the trailing edge (labeled 200 in FIG. 5) of positive portion 202 of the induced voltage $U_{3A-3B}$, which causes flip-flop 64 to switch over approximately at its zero crossing, (Rising edge 201 in FIG. 5 occurs directly after a switchover of flip-flop 64, when the corresponding output-stage transistor 56 is inhibited.)

When motor 4 is switched on, the different values of capacitors 84 (e.g. 6.8 nF) and 90 (e.g. 3.3 nF) mean that transistor 100 becomes conductive, so that at startup, winding phase 25 is always the first to receive current via its transistor 56, and motor 4 thus starts in the correct rotation direction from its starting position that is brought about by magnets 8 in FIG. 2. Flip-flop 64 thus, when switching on occurs, acquires an electrical preferred position which is correctly associated with the starting position of rotor magnet 28.

Since transistor 100 has become conductive as a result of this switchover pulse, transistor 62 is inhibited via resistor 112, and conversely transistor 56 is switched on via resistor 114 because transistor 102 is inhibited, so that winding phase 25 now receives current.

The switching on of transistor 56 is delayed by resistor 114 and capacitor 126, and the switching off of transistor 62 is similarly delayed by resistor 112 and capacitor 128, so that despite the abrupt switchover of flip-flop 64, the switching operations proceed smoothly and no unpleasant motor noise is created by rapid switching operations.

Because of the symmetry of the circuit, commutation in the opposite direction, i.e. from transistor 56 (becomes inhibited) to transistor 62 (becomes conductive) does not need to be described, since the operations occur as the inverse of the operations just described.

The positive induced voltage in a currentless winding phase 25 or 26 is thus converted by the above-described circuit into a square-wave signal, and the edge at the end of that square wave causes a switchover pulse for flip-flop 64 which causes the previously currentless transistor (56 or 62) to be switched on and the previously conductive transistor (62 or 56) to be switched off. This results in secure and reliable commutation by way of the induced voltage, smooth and low-noise commutation being achieved due to the above-described delay circuit elements, despite the abrupt switchover of flip-flop 64.

Figure 7:
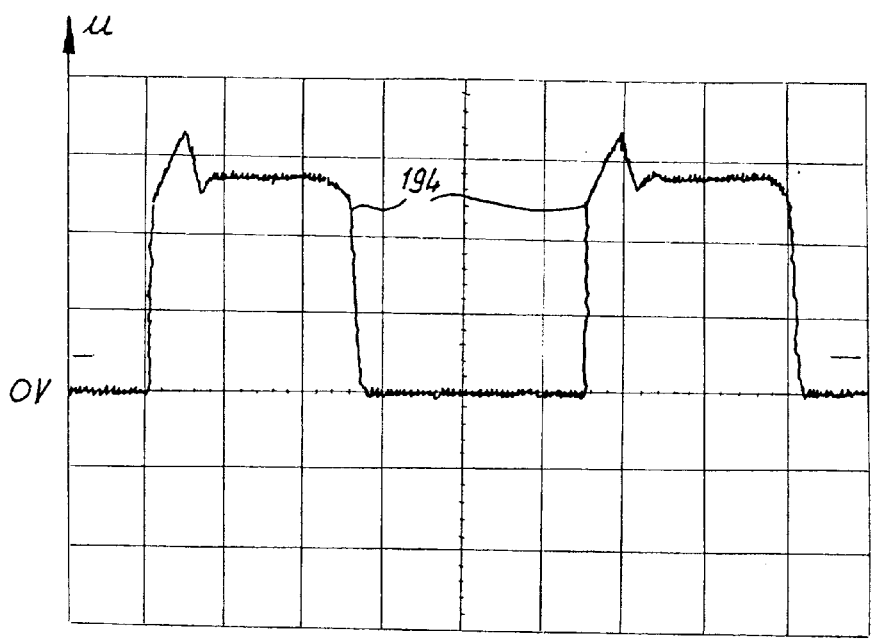
FIG. 7 is a graph of the voltage at an output S of the circuit of FIG. 4 when the motor is rotating.
Figure 8:
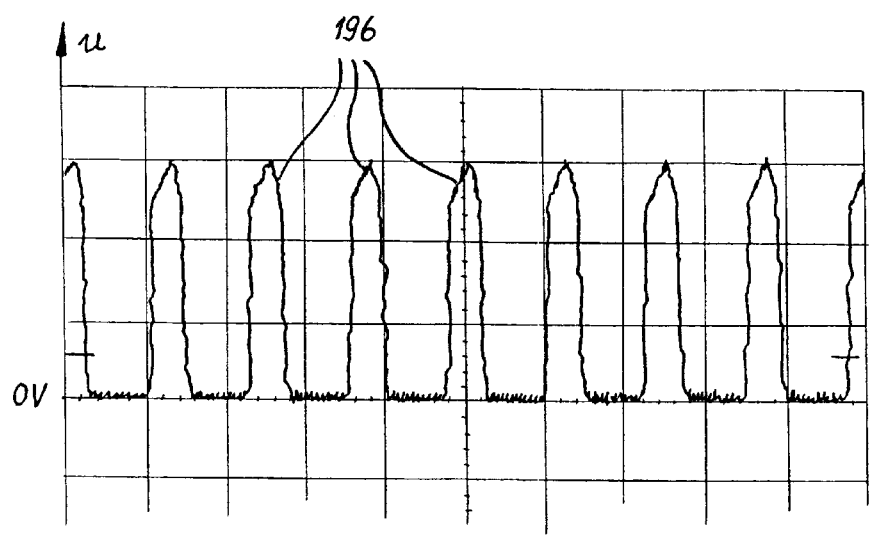
FIG. 8 is a graph of the voltage at output S of FIG. 4 when rotor 6 is jammed or blocked from rotating.

An external terminal S is connected via a resistor 190 to the collector of transistor 150. The signal at that collector, shown in FIGS. 7 and 8, indicates whether motor 4 is rotating or is jammed or blocked. If motor 4 is rotating, pulses 194 are obtained at terminal S at a frequency that is proportional to the motor rotation speed. This state is shown in FIG. 7. If the motor is jammed, what is received at output S are pulses 196 at a very high frequency, or alternatively a zero frequency. The state with the high frequency is shown in FIG. 8. This makes it easy to monitor whether motor 4 is running or is jammed.

Preferred values of the components in FIG. 4

| Motor: | |
| --- | --- |
| Operating voltage | 8 to 16 V |
| Power consumption | 0.5 W |
| Rotation speed | 2800 RPM |
| Transistors 56, 62 | BC817/40 |
| Transistors 136, 150, 170 | ½ BC857BS |
| Other transistors | ½ BC847BS |
| Diodes 164 | BAV99 |
| Diodes 82, 88 | BAS216 |
| Capacitors 126, 128 | 47 nF |
| Capacitor 84 | 6.8 nF |
| Capacitor 90 | 3.3 nF |
| Capacitor 146 | 220 nF |
| Resistors 104, 106, 118, 122, 134, 154, 172 | 10 kΩ |
| Resistors 108, 110, 156, 160, 174, 178, 190 | 100 kΩ |
| Resistors 112, 114 | 15 kΩ |
| Resistor 166 | 51 kΩ |
| Resistor 116 | 39 kΩ |
| Resistors 140, 144 | 1 MΩ |

Many variants and modifications are of course possible within the scope of the present invention. Therefore, the invention is not limited to the particular embodiments shown and described, but rather is defined by the following claims.

What is claimed is:

1. An electronically commutated motor (4) comprising:
    a stator (14) that has two winding phases (25, 26), of which, during one rotor rotation of 360° el., firstly current is delivered to the one winding phase (25) within a first rotation angle ranger via an associated first semiconductor switch (56), and within a subsequent second rotation angle range, current is delivered to the other winding phase (26) via an associated second semiconductor switch (62);
    a permanent-magnet rotor (28) which, when the motor (4) is currentless, assumes at least one predefined rotational position, from which the rotor (28) starts in a desired rotation direction upon excitation of a predefined winding phase;
    a commutation apparatus for alternatingly switching on the first semiconductor switch (56) or the second semiconductor switch (62), said commutation apparatus comprising a bistable multivibrator (64) whose switching state is controlled by the voltages that are induced, respectively, by the permanent-magnet rotor (28) in that winding phase (25 or 26) which is currentless at that instant and which, in the instantaneous rotation angle range of the rotor (28), in not being supplied with current via its associated semiconductor switch (56 or 62);
    the bistable multivibrator (64) having an electrical preferred position (92) that it assumes when the motor (4) is switched on, in order to supply power, during the switching-on operation, to the predefined winding phase.

2. The motor according to claim 1, wherein the voltage induced in the currentless winding phase is transformed via a pulse-shaper stage (80, 86) into a switching pulse (76, 78) for switching over the bistable multivibrator (64).

3. The motor according to claim 1, further comprising a current regulator (58) which regulates the current (I) through the winding phases (25, 26) to a predefined value.

4. The motor according to claim 3, further comprising an arrangement (94) which deactivates the current regulator (58) during a predefined time period after the motor (4) is switched on, in order to allow an increased starting current.

5. The motor according to claim 4, wherein the arrangement (94) has a switching member (132) which is switched on during a predefined time period after the motor (4) is switched on and, in that context, bypasses the current regulator (58) in order to allow an increased starting current through the predefined winding phase.

6. The motor according to claim 3, wherein the semiconductor switches are configured as power transistors (56, 62);
    and each power transistor has, associated with it, a transistor (120, 124) which becomes more conductive as the motor current (I) increases and thus reduces the base current of the power transistor (56, 62) associated with it, so as thereby to keep the motor current (I) substantially constant during operation.

7. The motor according to claim 3, wherein the current (I) through the winding phases (25 or 26) is regulated to a substantially constant value when the motor is running.

8. The motor according to claim 1, wherein there is provided, for each winding phase (25, 26), a diode (82, 88) which is polarized in such a way that it decouples the induced voltage from that winding phase which, in the instantaneous rotation angle range of the rotor (28), is not being supplied with current via its associated semiconductor switch (56 or 62).

9. The motor according to claim 8, wherein the decoupled induced voltage (FIG. 5) is transformed into a substantially square-wave signal;
    and the switchover of the bistable multivibrator (64) is controlled by an edge of that signal.

10. The motor according to claim 1, wherein a terminal (S) is provided at which, when the motor is rotating, a signal (194) can be picked off, whose frequency is determined by a voltage that is induced by the permanent-magnet rotor (28) in a currentless winding phase (25 or 26) that, in the instantaneous rotation angle range of the rotor (28), is not being supplied with power via its associated semiconductor switch (56 or 62).

11. The motor according to claim 1, wherein the bistable multivibrator (64) is brought into an electrical preferred position by way of the switching-on operation of the motor (4).

* * * * *